(12) United States Patent
Abitrabi et al.

(10) Patent No.: US 9,268,057 B2
(45) Date of Patent: Feb. 23, 2016

(54) REAL-TIME DYNAMIC DATA VALIDATION APPARATUS AND COMPUTER READABLE MEDIA FOR INTELLIGENT FIELDS

(71) Applicant: Saudi Arabian Oil Company, Dhahran (SA)

(72) Inventors: Abdel Nasser Abitrabi, Dhahran (SA); Fahad Al-Ajmi, Dhahran (SA); Majed Awajy, Dhahran (SA); Marc Lamontagne, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 571 days.

(21) Appl. No.: 13/731,257

(22) Filed: Dec. 31, 2012

(65) Prior Publication Data
US 2013/0173168 A1    Jul. 4, 2013

Related U.S. Application Data

(60) Provisional application No. 61/582,350, filed on Dec. 31, 2011.

(51) Int. Cl.
*G01V 9/00*    (2006.01)
*G06F 17/00*   (2006.01)
(Continued)

(52) U.S. Cl.
CPC . *G01V 9/00* (2013.01); *E21B 43/32* (2013.01); *G06F 17/00* (2013.01); *E21B 7/068* (2013.01);
(Continued)

(58) Field of Classification Search
CPC ....... G01V 11/00; G01V 11/002; G01V 9/02; G01V 9/007; G01V 1/40; G01V 1/50; G01V 1/46; G01V 1/48; G01V 2210/72; E21B 7/068; E21B 49/00; E21B 47/07; E21B 47/068; E21B 47/06
USPC ................................... 702/11–13, 6
See application file for complete search history.

(56) References Cited

U.S. PATENT DOCUMENTS 4,267,885 A * 5/1981 Sanderford .............. 166/250.01
5,934,371 A   8/1999 Bussear et al.
(Continued)

FOREIGN PATENT DOCUMENTS

WO    WO0123705 A1    4/2001

OTHER PUBLICATIONS

N.A. Nasser; Intelligent Field Data Management: Case Study; SPE 149040—Society of Petroleum Engineers, May 15-18, 2011.
(Continued)

*Primary Examiner* — John Breene
*Assistant Examiner* — Lynda Dinh
(74) *Attorney, Agent, or Firm* — Bracewell & Giuliani LLP; Constance G. Rhebergen; Christopher L. Drymalla

(57) ABSTRACT

Apparatus and computer readable media for managing an intelligent field, are provided. An exemplary apparatus can include hydrocarbon well instruments, a SCADA system, a process integration server and/or dynamic field data analyzing computer, and memory/computer readable media storing a dynamic field data analyzing computer program. The computer program can include instructions that when executed cause the dynamic field data analyzing computer to perform various operations to include receiving real-time dynamic field data, analyzing validity of the dynamic field data, validating values of the field data, validating a state/condition of a well, and flagging well components, well conditions, and/or well state validation issues.

38 Claims, 8 Drawing Sheets

(51) Int. Cl.
*E21B 43/32* (2006.01)
*G01V 9/02* (2006.01)
*G01V 1/46* (2006.01)
*G01V 1/50* (2006.01)
*G01V 1/40* (2006.01)
*G01V 11/00* (2006.01)
*E21B 49/00* (2006.01)
*E21B 7/06* (2006.01)
*G01V 1/48* (2006.01)

(52) U.S. Cl.
CPC . *E21B 49/00* (2013.01); *G01V 1/40* (2013.01); *G01V 1/46* (2013.01); *G01V 1/48* (2013.01); *G01V 1/50* (2013.01); *G01V 9/007* (2013.01); *G01V 9/02* (2013.01); *G01V 11/002* (2013.01); *G01V 2210/72* (2013.01)

(56) References Cited

U.S. PATENT DOCUMENTS

| | | |
|---|---|---|
| 6,450,002 B1 | 9/2002 | Smith |
| 6,873,267 B1 | 3/2005 | Tubel et al. |
| 7,147,058 B1* | 12/2006 | Shaposhnikov ...... E21B 43/122 166/105 |
| 7,672,825 B2 | 3/2010 | Brouwer et al. |
| 7,707,009 B2 | 4/2010 | Steinke |
| 8,838,390 B1* | 9/2014 | Selman ................. E21B 44/00 166/264 |
| 2003/0079912 A1* | 5/2003 | Leuchtenberg ................. 175/38 |
| 2008/0154510 A1* | 6/2008 | Scott ...................... E21B 43/12 702/12 |
| 2009/0234584 A1* | 9/2009 | Casey et al. ..................... 702/12 |
| 2009/0234623 A1 | 9/2009 | Germain |
| 2009/0254325 A1 | 10/2009 | Gokdemir et al. |
| 2009/0276100 A1 | 11/2009 | Malki et al. |
| 2010/0050017 A1 | 2/2010 | Almadi et al. |
| 2010/0076740 A1 | 3/2010 | Kuchuk et al. |
| 2011/0220410 A1* | 9/2011 | Aldred ................... E21B 44/00 175/26 |
| 2012/0294114 A1* | 11/2012 | Gochnour ........... E21B 43/0122 367/13 |

OTHER PUBLICATIONS

Search Report and Written Opinion for Related PCT application PCT/US2012/072274, dated Feb. 10, 2014.
P. Flichy; Integrated Operation User Experience Starts With Data Flagging; SPE 133728—Society of Petroleum Engineers, Sep. 19-22, 2010.

* cited by examiner

REAL-TIME DYNAMIC DATA VALIDATION APPARATUS AND COMPUTER READABLE MEDIA FOR INTELLIGENT FIELDS

RELATED APPLICATIONS

This application is a non-provisional of and claims priority to and the benefit of U.S. Patent App. No. 61/582,350, filed on Dec. 31, 2011, titled "Real-Time Dynamic Data Validation Apparatus, System, Program Code, Computer Readable Medium, and Methods For Intelligent Fields," and is related to U.S. patent application Ser. No. 13/731,238, filed on Dec. 31, 2012, titled "Real-Time Dynamic Data Validation Methods for Intelligent Fields, " each incorporated by reference in its entirety.

BACKGROUND OF THE INVENTION

1. Field of the Invention

The present invention relates generally to the oil and gas industry, particularly reservoir management, and more particularly to apparatus, systems, program code, and methods for managing an intelligent field.

2. Description of the Related Art

Advances in technology continue to have a great impact on the petroleum industry. Within the past 20, years, many technologies have transformed the way oil and gas companies manage and/or optimize their operations. One such technology includes permanent downhole monitoring systems (PDHMS), which were introduced over 20, years ago. A PDHMS surface unit typically is used to collect subsurface sensor performance data, i.e., pressure and temperature gauges. Other technologies include, for example, multiphase flow meters (MPFMs) which provide individual flow rates for oil, gas, and water in a producing well, wellhead pressure and temperature (WHP/T) measurement devices which provide measured wellhead pressure and temperature, tubing/casing annulus (TCA) pressure measuring devices, and electrical submersible pump (ESP) devices for assisting the oil to the surface, which provide measurable electrical and pump parameters.

Early installations were often in the form of self-contained devices having removable modules. Some more conventional configurations include wire or fiber-optic connection, which communicate the data to surface-based units. Others include a network topography which provides such data between the various sensors and the surface-based units.

Initial methodologies of transferring the data received by the surface-based units to a central computer or monitoring station included use of physical transport and/or transmission over land-based wire lines. More recent technologies employed by the assignee of the respective invention or inventions include utilization of radiowave well data monitoring which can include individual well transmitters that transmit to a remote terminal unit (RTU) that sends the data by UHF radio to an information server or SCADA system, which can then migrate the data over a local communication network to desktops of production engineers. An exemplary system is described, for example, in U.S. patent application Ser. No. 12/547,295,, titled: "Intelligent Field Oil and Gas Field Data Acquisition, Delivery, Control, and Retention Based Apparatus, Program Product and Related Methods," incorporated by reference in its entirety. Similar technologies include utilization of global satellite mobile or cellular telephone based communication, which have generally been employed as a backup to provide alerts. Such technologies of remote monitoring of field data can provide the wellhead pressure, wellhead temperature, downhole pressure, downhole temperature, annuli pressures, fluid flow rate for individual fluid phases, and electrical submersible pump data, both in real-time and on demand, to allow centralized well control.

The field data, however, can be unreliable, e.g., outside the boundaries of valid data. The field data can also be invalid, e.g., within the boundaries of valid data but substantially deviating from expected data values based on given conditions. The field data can also be incomplete, e.g., missing data.

SUMMARY OF THE INVENTION

Recognized by the inventors, therefore, is the need for apparatus, systems, program code/computer readable medium, and methods to identify and process unreliable data, to identify and process invalid data, and which can identify and process incomplete data.

In view of the foregoing, various embodiments of the present invention provide real-time dynamic data validation of data from/for intelligent field components, real-time advance validation that combines multiple engineering logics to validate dynamic data values, and real-time anomalies detection (e.g., badwater production, well on/off state or condition), bad fluid rate, bad fluid increase or decrease, etc.) that trigger alerts for immediate action to be taken to ensure, in real-time, to provide optimum well performance. Various embodiments of the present invention provide an alternative methodology of estimating the total fluid production rate and gradient. Various embodiments of the present invention also provide a methodology to confirm water production by using down hole pressure and temperature sensors, a methodology to recommend I-Field equipment corrected calibrations, and a methodology that provides a real time well productivity index (PI) estimation.

Various embodiments of the present invention advantageously provide apparatus, systems, program code/computer readable medium, and methods of managing and intelligent field through the retrieval and processing of real-time dynamic data validation to raw data, typically first identified as being within the boundaries of reliable data (within the continuum of machine possibilities), but not yet determined to be valid (within the continuum of expected conditions).

More specifically, an example of an embodiment of an apparatus for managing intelligent field. According to the exemplary embodiment, the apparatus includes a plurality of hydrocarbon well instruments. The well instruments data can include a permanent downhole monitoring system (PDHMS), a multiphase flow meter (MPFM), a wellhead pressure (WHP) and wellhead temperature (WHT) measurement device, a tubing or casing annulus (TCA) pressure measurement, and optionally, an electrical submersible pump (ESP) when required or otherwise desired. The apparatus can also include a supervisory control and data acquisition (SCADA) system for an intelligent hydrocarbon recovery field system operably coupled to the plurality of well instruments to receive data therefrom. The apparatus can also include a process integration (PI) server for the intelligent field system operably coupled to the SCADA system to receive data therefrom. The apparatus can also include a dynamic field data analyzing computer operably coupled to the PI server to receive data therefrom. The apparatus can also include dynamic field data analyzing computer program stored in the memory of the dynamic field data analyzing computer and/or deliverable on a standalone computer readable medium.

The dynamic field data analyzing computer program can include instructions that when executed by the dynamic field data analyzing computer (i.e., one or more processors associated therewith), cause the computer to perform various operations to include receiving at least substantially real-time dynamic field data for an intelligent field system. The received data can include at least substantially real-time field data, but more typically, real-time field data with a negligible delay, containing one or more component data values for each of a plurality of well instruments for each of a plurality of wells. The operations can also include determining a plurality of well parameters for a corresponding plurality of different well conditions for each well responsive to the received dynamic field data and analyzing the validity of the plurality of well parameters. The analysis can include comparing each of the plurality of the well parameters (e.g., actual component data for one or more of the well instruments) to corresponding validation criteria, typically generated from the other of the well instrument parameter values. The operations can also include validating the values of the field data for at least one well instrument when the actual component data value falls within the validation criteria, and flagging the actual component data value for the at least one well instrument when the actual component data value falls outside the validation criteria. The operations can also include validating a well state or condition when a plurality of well conditions associated therewith have valid well parameters that satisfy the corresponding validation criteria, and flagging the well state or condition when the values are out of tolerance.

Various embodiments the present invention also include methods for managing an intelligent field. According to an exemplary embodiment of a method, the method steps can include receiving at least substantially real-time dynamic field data for an intelligent field system, determining a plurality of well parameters for a corresponding plurality of different well conditions responsive to the received dynamic field data, and analyzing the validity of the plurality of well parameters. The analysis can include comparing each of the plurality of the well parameters (e.g., actual component data for one or more of the well instruments) to corresponding validation criteria, typically generated from the other of the well instrument parameter values. The steps can also include validating the values of the field data for the at least one well instrument when the actual component data value falls within the validation criteria, and flagging the actual component data value for the at least one well instrument when the actual component data value falls outside the validation criteria. The steps can also include validating a well state or condition when a plurality of well conditions associated therewith have valid well parameters that satisfy the corresponding validation criteria, and flagging the well state or condition when the values are out of tolerance.

Various embodiments of the present invention provide manpower time optimization through implementation of various automated data validation processes, provide a manpower time reduction by effectively detecting and requesting I-Field component calibration, improve the process of detecting real time data validation issues, improve engineering data mining and supporting data analysis process, ensure data supports ultimate objective of reservoir management through effective decision making, provide early detection for water breakthrough, provide early detection for gas segregation at the reservoir face, ensure optimum well productivity, improve I-field component working efficiency, and guaranty I-field network component optimization.

Early detection of water breakthrough and/or increased water production as well as early detection of gas segregation at the reservoir face can advantageously be provided as a result of the real-time monitoring of the trend in the bottom hole fluid gradient. Optimum well productivity can advantageously be provided by monitoring any variation on the bottom hole fluid gradient, wellhead temperature, and wellhead pressure values, for example, to prevent early water breakthrough, gas separation, etc., which can cause severe damage to the formation. I-field network component optimization can advantageously be provided by utilization of triggers and alarms indicating when data is not meeting engineering logics and/or requiring validation for proper inspection and calibration, which can allow I-field components to work at near maximum efficiency.

Various embodiments of the present invention advantageously provide for improving the process of validation real time data, provide a new process to calibrate I-field component such as multi-phase flow meters (MPFM), provide a new process to estimate in real time fluid gradient, provide a new process to back calculate water cut, support expediting remedial actions of I-field components through early anomalies detection, ensure valid data at engineering desktop, and provide for shifting focus to engineering analysis rather than data mining. Various embodiments of the present invention advantageously provide a platform for other innovative intelligent field projects through ensuring the validity of the data in real time, validate and manage massive amount of real time data with minimum engineering effort, and improve the process of validating real time data. Various embodiments of the present invention advantageously provide a system/apparatus that has the capacity to monitor, and proactively detect, any anomalies from oil and water injector wells, as captured by real-time data.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
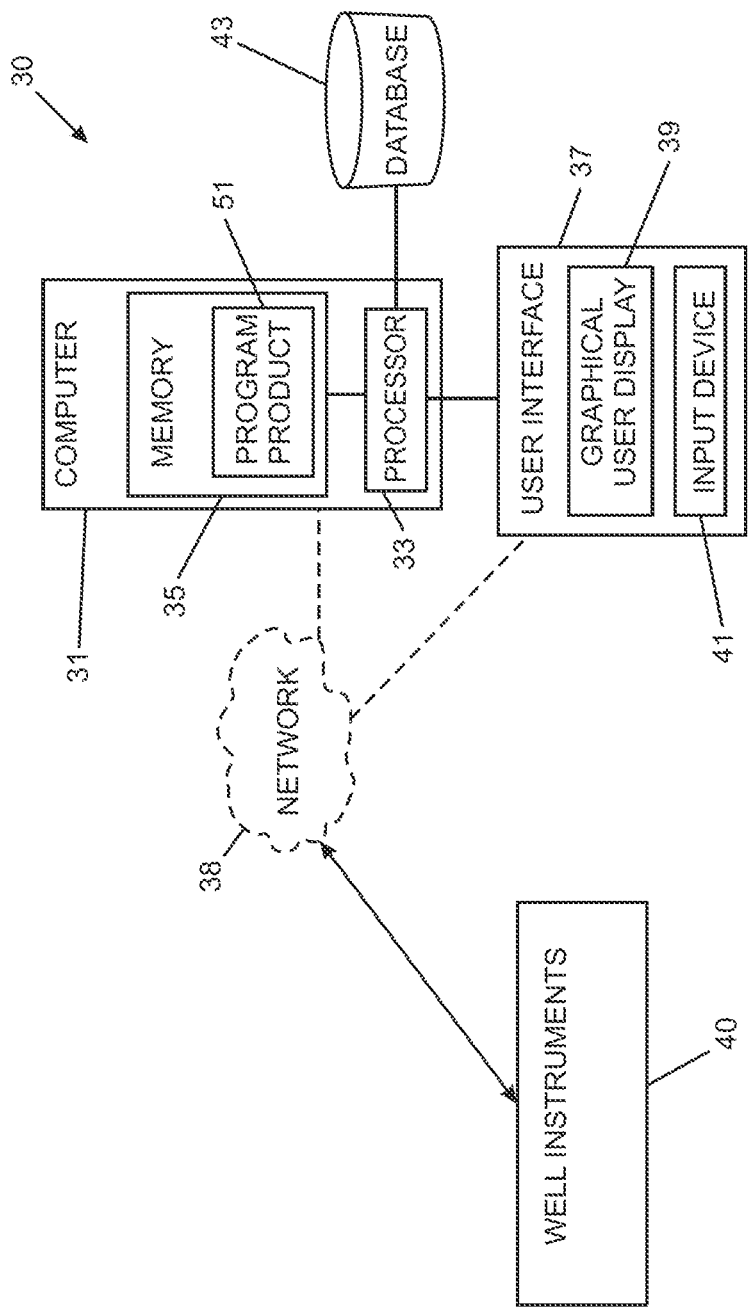
FIG. 1 is a schematic diagram of a general architecture of an apparatus for managing an intelligent field according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Ensuring the flow of reliable, valid, and complete real-time data from the various intelligent field (I-field) components to engineers' desktop is a vital process to efficiently utilize real-time data in field management. Various apparatus, systems, computer program/computer readable medium, and methods for monitoring the reliability of key performance indicators in intelligent oil fields, termed "WDEye," are described, for example, in U.S. Patent App. No. 61/561,541, filed Nov. 18, 2011,, incorporated herein by reference in its entirety. Various apparatus, systems, computer program/computer readable medium, and several methods for managing an intelligent field to include providing/applying real-time dynamic data validation/estimation, termed "WDvalidation," advanced anomaly detection, and correct equipment calibration specification/recommendations for I-field components, are described below.

Various embodiments of the present invention employ multiple reservoir management and production engineering logics that can interact with each other in order to provide for determining a specific event related to a well. Each logic can react based upon the data to be validated by applying a weight average to each component of each logic. Further, various embodiments of the present invention apply a new methodology to estimate, in real time, the bottom hole fluid gradient, and a new methodology which utilizes the bottom hole fluid gradient to precisely estimate water influx into a well. Various embodiments of the present invention provide real time advance validation and anomalies detection that trigger alerts for immediate action to be taken to ensure, in real time, optimum well performance. Various embodiments of the present invention also provide an automated process of validating, in real time, the well on and off state/condition for oil, water injection (PWI), and observation wells; the oil, water and gas rate changes; and the surface and bottom hole pressure and temperature, along with others. Various embodiments of the present invention provide a new methodology to estimate, in real time, fluid gradient trending, as well as an innovative new methodology to calibrate surface I-fields components such as multiphase flow meters (MPFM), well head pressure and temperature measuring equipment, among others, against a set of reservoir management and production engineering logics.

Additionally, various embodiments of the present invention provide an automated process for validating, in real time, wellhead pressure and temperature (WHP/T) measurements, tubing/casing annulus (TCA) pressure, choke size, electrical submersible pump (ESP) readings and rate estimation, along with real time flow rate estimation for a producing well completed with an ESP. The various embodiments of the present invention can incorporate ESP parameters such as, for example, bottom hole dynamic pressure (intake and discharge), electrical parameters (amps), working frequency (hz), FWHP (psi). Utilizing these parameters, a synthetic rate can be estimated. Additionally, various embodiments of the present invention can estimate, in real time, and incorporate, the productivity index (PI) and injection index (II).

FIG. 1 illustrates an example of an apparatus 30 for managing an intelligent field through real-time dynamic data validation. The apparatus 30 can include a dynamic field data validity analyzing computer 31 having a processor 33, memory 35 coupled to the processor 33 to store software and database records therein, and a user interface 37 that can include a graphical display 39 for displaying graphical images, and a user input device 41 as known to those skilled in the art, to provide a user access to manipulate the software and database records. Note, the computer 31 can be in the form of a personal computer or in the form of a server or multiple servers serving multiple user interfaces 37. Accordingly, the user interface 37 can be either directly connected to the computer 31 or through a network 38 as known to those skilled in the art. The plurality of well instruments 40 are either in direct coupled communication with the computer 31, for example, via network 38, or in communication via manual delivery and unloading.

The apparatus 30 can also include one or more tables and/or databases 43 stored in memory (internal or external) that is operably coupled to the dynamic field data validity analyzing computer 31, as would be understood by those skilled in the art. The one or more databases 43 can include validated field data, validated well parameters including, for example, validated bottom hole fluid gradient data, and can include validated well state/condition data.

The apparatus 30 can also include dynamic field data validity analyzing computer program 51 stored in memory 35 of the dynamic field data validity analyzing computer 31 to provide for analyzing and validating dynamic field data, flagging component data points of well instruments 40 that lie outside an expected range of values given component data values of a plurality of other well instruments 40, estimating bottom hole fluid gradient trends, determining bottom hole pressure and temperature trends, determining multi phase (e.g., gas, oil, and water) flow trends, determining wellhead pressure (WHP) and wellhead temperature (WHT) trends, determining tubing or casing annulus (TCA) pressure trends, and determining electrical submersible pump (ESP) parameter trends.

The computer program 51 also provides for analyzing the validity of well parameters and validating well conditions and states, to include well shut-in, well on, oil production increase, oil production decrease, gas oil ratio (GOR) increase, GOR decrease, water cut increase, water cut decrease, bottom hole pressure decrease, bottom hole pressure increase, bottom hole temperature decrease, and bottom hole temperature increase states/conditions for an oil producer well; well off, well on, water injection rate increase, and water injection rate decrease states/conditions for a water injector well; and well off and well on states/conditions for an observation well, just to name a few.

Specific readings can also be validated. For example, choke size variation can be validated by integrating data from the WHP, WHT, bottom hole pressure (BHP), and/or bottom hole temperature (BHT). ESP reading can be validated for a comparison of BHP, amps, working frequency, and flowing well head pressure (FWHP). Rate estimation validation is performed using pumping working parameters.

Note, the dynamic field data validity analyzing computer program 51 can be in the form of microcode, programs, routines, and symbolic languages that provide a specific set or sets of ordered operations that control the functioning of the hardware and direct its operation, as known and understood by those skilled in the art. Note also, the dynamic field data validity analyzing computer program 51, according to one or more of the embodiments of the present invention, need not reside in its entirety in volatile memory, but can be selectively loaded, as necessary, according to various methodologies as known and understood by those skilled in the art.

Beneficially, various embodiments of the apparatus 30 can primarily use the real time fluid gradient trend to identify and detect water breakthrough. Fluid gradient alteration (increase) is a clear preliminary indication of water entry. Immediately after this detection, the apparatus 30 can perform a smart analysis that can integrate many more well parameters such as, for example, surface well head and bottom hole temperature and pressure to confirm the possible water entry. In case of presence of a multiphase flow meter (MPFM), the apparatus can cross check the values and highlight any anomaly. Further, by obtaining the derivative of the fluid gradient trending changes, water production values can be estimated.

Various embodiments of the apparatus 30 can also provide a process to recommend correction of calibration for I-field equipment. In general, proper calibration criteria will be provided after quantifying the discrepancy. For MPFM calibration, a calibration may be required in situations where the MPFM is reporting water production while the fluid gradient, well head pressure, and wellhead temperature are reflecting no presence of water. Additionally, calibration may be required in situations where the MPFM reported parameters do not meet logic criteria for the respective well on and off condition. For example, the MPFM may be sending flow rate data (oil, GOR, WC) while the well is in an off state/condition. For example, in a case where the surface MPFM is reporting 50% water cut (water production), but the bottom hole fluid gradient trend, wellhead pressure, and/or wellhead temperature are reflecting no presence of water (e.g., fluid gradient stable and no severe drop in well head pressure or increase in wellhead temperature), the apparatus 30 will send out an alert advising that the MPFM requires calibration. This example illustrates utilization of water cut values only so the calibration will normally be directed only to the MPFM water production detection component. In case discrepancies in the gas oil ratio (GOR), for example, the apparatus 30 will advise calibration on this component as well.

Various embodiments of the apparatus 30 can also provide real-time productivity index (PI) estimation (barrels of oil per pound pressure differential) typically written as Qo barrels of oil/reservoir pressure differential for bottom hole flowing pressure. This value is estimated, in real time, and can be integrated with multiple parameters to confirm the value. As with PI, the injection index (II) estimation validation includes implementation of conventional steps in conjunction with the addition of logic integration in real time, of several parameters such as, for example, FWHP/T, BHP/T, and choke changes.

The following tables illustrate examples of typical physical well states. The tables present logics which can be employed by the computer program 51 to perform the validation. Each table includes a plurality of rules typically in the form of validated and/or observed well conditions, a selected tolerance, a relative weight of the respective rule in relation to the other rules, and a preferred minimum number of rules which should be utilized in validating the particular well state. Where a rule is in the form of calculated/estimated well condition such as, for example, a trend in a specific well parameter or parameters, the respective well parameter or parameters are themselves first determined to be validated and reliable according to an exemplary embodiment.

The following ten tables illustrate the active well logic to perform a validation of the various states/conditions for an oil-producing well. The logic described in the first two tables allows the user to differentiate between reliable and non-reliable zero rates. The zero rate for non-active well (shut-in) should be reliable. At least three conditions with valid parameters must be satisfied to identify the on/off status of the well and then validate the rate. The zero rate will be considered non-reliable if at least three of the conditions with valid data were not satisfied:

Oil Producer Wells:
Well Shut-in State/Condition:

| Rule | Tolerance | Weight | Minimum number of rules to be checked. |
|---|---|---|---|
| Upstream pressure = Downstream pressure | ±25% | 30 | 3 |
| WHT Decrease, close to ambient Temperature | ±5% | 50 | |
| Choke size <2% | | 10 | |
| Flowing BHP increase | ≥10% | 30 | |
| Flowing BHT decrease | 4° F. below average | 20 | |
| ESP Hz = 0 | | 40 | |
| Amp = 0 | | 40 | |

Well ON State/State/Condition:

| Rule | Tolerance | Weight | Minimum number of rules to be checked. |
|---|---|---|---|
| Upstream pressure # Downstream pressure | ±25% | 30 | 3 |
| WHT increase | 5% ≥ ambient | 50 | |
| Choke size >2% | | 20 | |
| ESP Hz > 0 | | 40 | |
| Amp > 0 | | 40 | |

Oil Production Increase

| Rule | Tolerance | Weight | Minimum number of rules to be checked |
|---|---|---|---|
| Flowing well head pressure decrease | 5% | 30 | 3 |
| WHT increase | 2% | 20 | |
| Choke size increase | 2% | 30 | |
| BHP decrease | 5% | 40 | |
| BHT increase | 2% | 20 | |

-continued

| Rule | Tolerance | Weight | Minimum number of rules to be checked. |
|---|---|---|---|
| Hz increase | 1% | 40 | |
| Bottom hole intake P decrease | 5% | 20 | |
| Bottom hole discharge P increase | 5% | 20 | |

Oil Production Decrease

| Rule | Tolerance | Weight | Minimum number of rules to be checked. |
|---|---|---|---|
| WHP increase | 2% | 30 | 3 |
| WHT decrease but still above ambient | 2% above ambient | 30 | |
| Choke size decrease | 2% | 20 | |
| BHP increase | 3% | 30 | |
| BHT decrease | 2% | 10 | |
| Hz decrease | 3% | 20 | |
| Amp decrease | 3% | 20 | |

Water Cut Increase:

| Rule | Tolerance | Weight | Minimum number of rules to be checked. |
|---|---|---|---|
| WHP decrease | 15% | 30 | 2 |
| Fluid gradient increase | ≥0.02 | 50 | |
| WHT increase | ≥2° F. | 20 | |
| BHP decrease | 5% | 20 | |

Water Cut Decrease:

| Rule | Tolerance | Weight | Minimum number of rules to be checked. |
|---|---|---|---|
| WHP increase | ≥15% | 30 | 2 |
| Fluid gradient decrease | 0.02 | 40 | |
| WHT decrease | 2° F. | 20 | |
| BHP increase | 5% | 20 | |

In an oil well, the gas oil ratio (GOR) should be constant. Changes in the GOR, however, can follow the following logics:

GOR Increase:

| Rule | Tolerance | Weight | Minimum number of rules to be checked. |
|---|---|---|---|
| Water cut increase | | 10 | 2 |
| WHP increase | ≥15% | 20 | |
| Fluid gradient decrease | 0.02 | 50 | |
| WHT decrease | 2° F. | 20 | |

GOR Decrease:

| Rule | Tolerance | Weight | Minimum number of rules to be checked. |
|---|---|---|---|
| WHP decrease | 15% | 30 | 2 |
| Fluid gradient increase | ≥0.02 | 50 | |
| WHT increase | ≥2° F. | 20 | |

Bottom hole temperature (BHT) and bottom hole pressure (BHP) can be verified utilizing measurements from a permanent down hole pressure/temperature measurement system (PDHMS). Note, BHP and BHT values will always be>0.

Bottom Hole Pressure Decrease:

| Rule | Tolerance | Weight | Minimum number of rules to be checked. |
|---|---|---|---|
| Choke size increase | ≥2% | 40 | 2 |
| Well head temperature increase | ≥5% | 50 | |
| Bottom hole temperature increase | ≥5% | 30 | |

Bottom Hole Pressure Increase:

| Rule | Tolerance | Weight | Minimum number of rules to be checked. |
|---|---|---|---|
| Choke size decrease | 2% | 40 | 2 |
| Well head temperature decrease | 5% | 50 | |
| Bottom hole temperature decrease | 5% | 30 | |

The following four tables illustrate the active well logic to perform a validation of the various states/conditions for power well injectors (PWI).

Water Injectors (PWI):
On and Off Well State/Condition:
Well OFF State/Condition:

| Rule | Tolerance | Weight | Minimum number of rules to be checked. |
|---|---|---|---|
| Choke size less than 5% | | 40 | 2 |
| WHP decrease | 50% | 50 | |
| WHT decrease, close to ambient Temp | ≥2° F. | 30 | |

Well ON State/Condition:

| Rule | Tolerance | Weight | Minimum number of rules to be checked. |
|---|---|---|---|
| Choke size greater than 10% | | 40 | 2 |
| WHP increase | 50% | 50 | |
| WHT increase | 2° F. > ambient | 30 | |

Water Injection Rate:
Water Injection Rate Increase:

| Rule | Tolerance | Weight | Minimum number of rules to be checked. |
|---|---|---|---|
| Choke size increase | ≥20% | 40 | 2 |
| WHP increase | ≥10% | 40 | |
| WHT increase | 5% | 30 | |

Water Injection Rate Decrease:

| Rule | Tolerance | Weight | Minimum number of rules to be checked. |
|---|---|---|---|
| Choke size decrease | 20% | 40 | 2 |
| WHP decrease | 20% | 40 | |
| WHT decrease | 5% | 30 | |

The following tables illustrate the active well logic to perform a validation of the various states/conditions for observation wells.

Observation Wells:
Well OFF State/Condition:

| Rule | Tolerance | Weight | Minimum number of rules to be checked. |
|---|---|---|---|
| Choke size <0.2 | | 20 | 2-3 depending upon the combination of selected rules |
| WHP decrease | 20 | 30 | |
| WHT decrease, close to ambient | 5° F. | 50 | |
| BHP Stable | 20% | 30 | |
| BHT Stable | 10% | 20 | |

Well ON State/Condition:

| Rule | Tolerance | Weight | Minimum number of rules to be checked. |
|---|---|---|---|
| Choke size > 0 | | 20 | 2-3 depending upon the combination of selected rules |
| WHP increase | 20% | 30 | |
| WHT increase, above ambient | ≥5° F. | 50 | |
| BHP decrease | 20% | 30 | |
| BHT decrease | 10% | 20 | |

Note, the above tables are provided for illustrative purposes, additional rules, tolerances, weights, and minimum number of combinations are, however, within the scope of the present invention.

Data Flow

Figure 2:
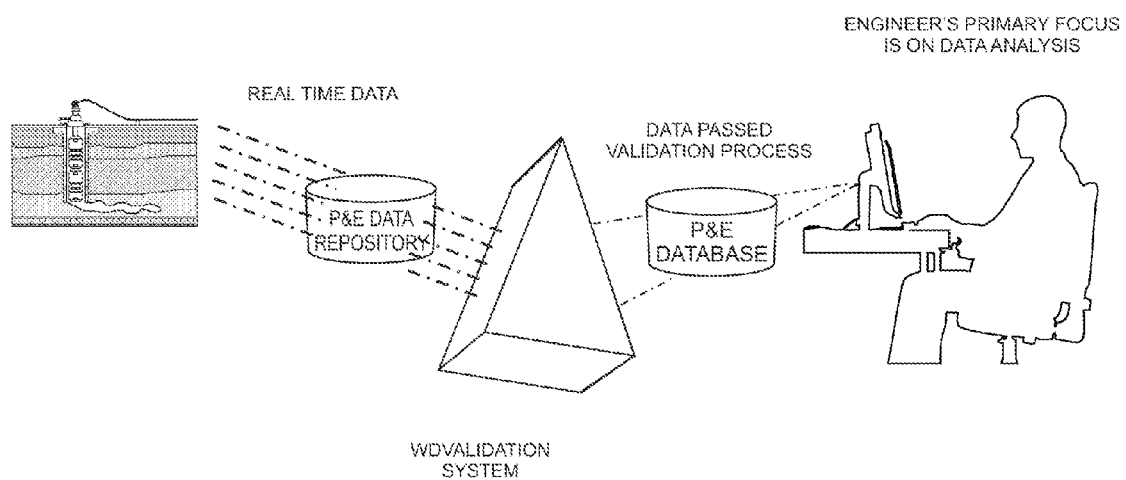
FIG. 2 is a schematic diagram high-level overview of data flow from the attainment of real-time raw/processed data from well instruments to the provision of validated data to engineers according to an embodiment of the present invention.

FIGS. 2-8 provide a graphical illustration of the data flow and employment of engineering logic, which can include data validation and component anomaly detection according to various exemplary embodiments the present invention. FIG. 2, for example, illustrates a high-level overview of data flow beginning from attainment of real-time raw/processed data from the well instruments 40 to the provision of validated data to engineers' desktops.

Figure 3:
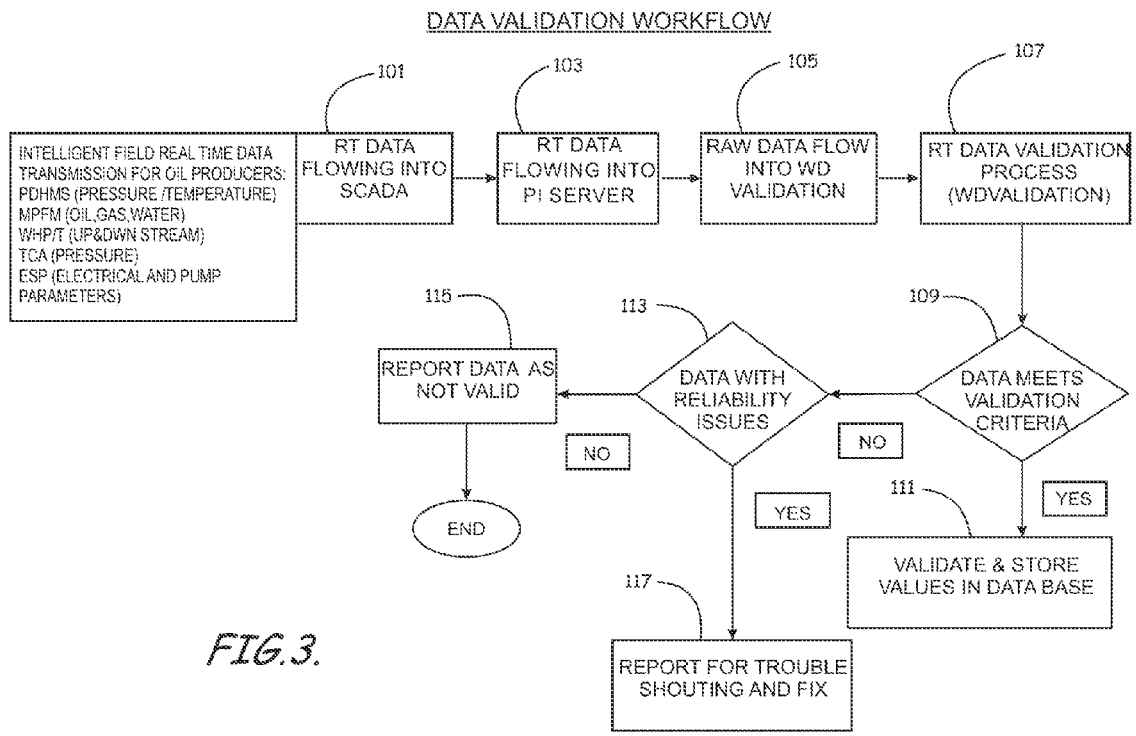
FIG. 3 is a schematic diagram illustrating an exemplary data validation workflow for an oil-producing well according to an embodiment of the present invention.

FIG. 3 illustrates an exemplary data validation workflow for an oil-producing well. At block 101, real-time (RT) data flows into and through a supervisory control and data acquisition (SCADA) system/server or other information server, and to a process integration (PI) server (block 103). The real-time raw data flow is then received and processed for validation (blocks 105, 107). If the data meets validation criteria (block 109), the data is deemed validated and stored in database 43 (block 111). If the data does not meet the validation criteria at block 109 and the data has reliability issues (e.g., outside possible machine limits) as opposed to validation issues (outside expected ranges of values, but in this analysis, within possible machine limits) as shown at block 113, an automated report is generated and sent indicating that the data is not valid or reliable (block 115). If the data is reliable but not valid at block 113, an automated alert and report is generated to initiate component troubleshooting and well measurement instrument component repair (block 117).

Figure 4:
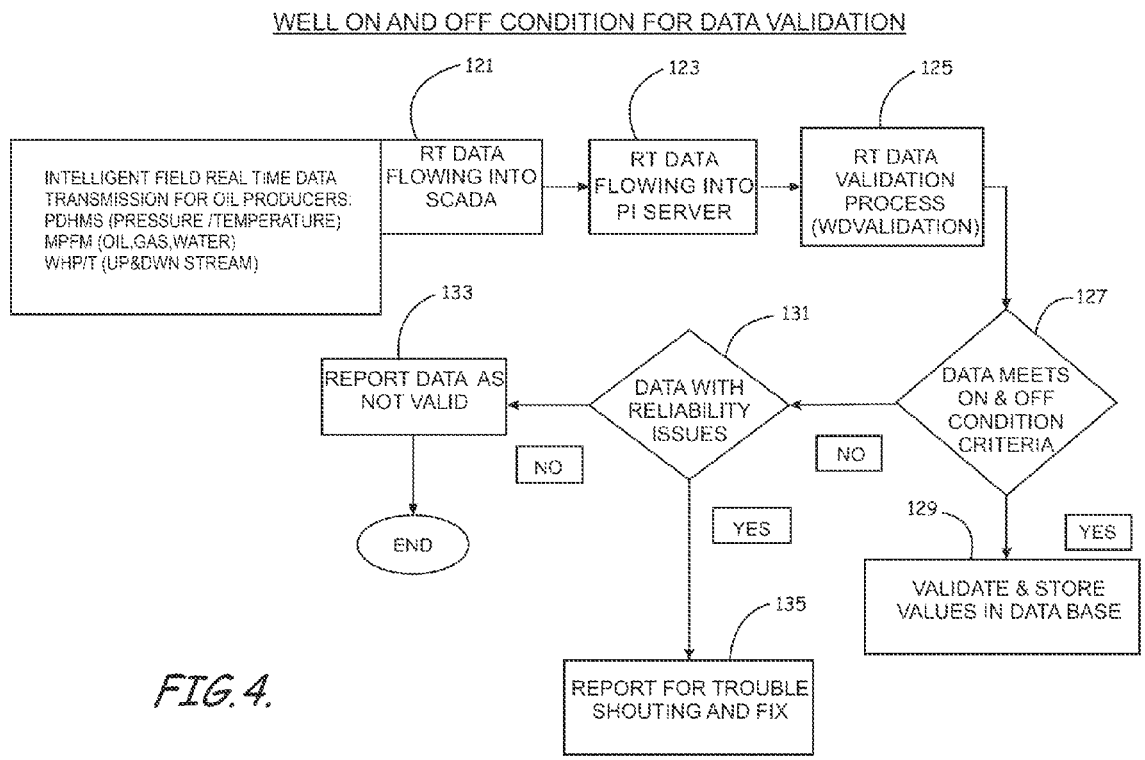
FIG. 4 is a schematic diagram illustrating an exemplary data flow for validating well on and off conditions for oil producers according to an embodiment of the present invention.

FIG. 4 illustrates an exemplary data flow for validating well on and off conditions for oil producers. At block 121, real-time data flows into and through a SCADA system/server or other information server, and to a process integration server (block 123). The real-time raw data flow is then received and processed for validation (blocks 125). If the data meets on and off condition validation criteria (block 127), the data is deemed validated and stored in database 43 (block 129). If the data does not meet the validation criteria at block 127 and the data is determined to have reliability issues (block 131), an automated report is generated and sent indicating that the data is not valid or reliable (block 133). If the data is reliable but not valid at block 131, an automated alert and report is generated to initiate component troubleshooting and well measurement instrument component repair (block 135).

Figure 5:
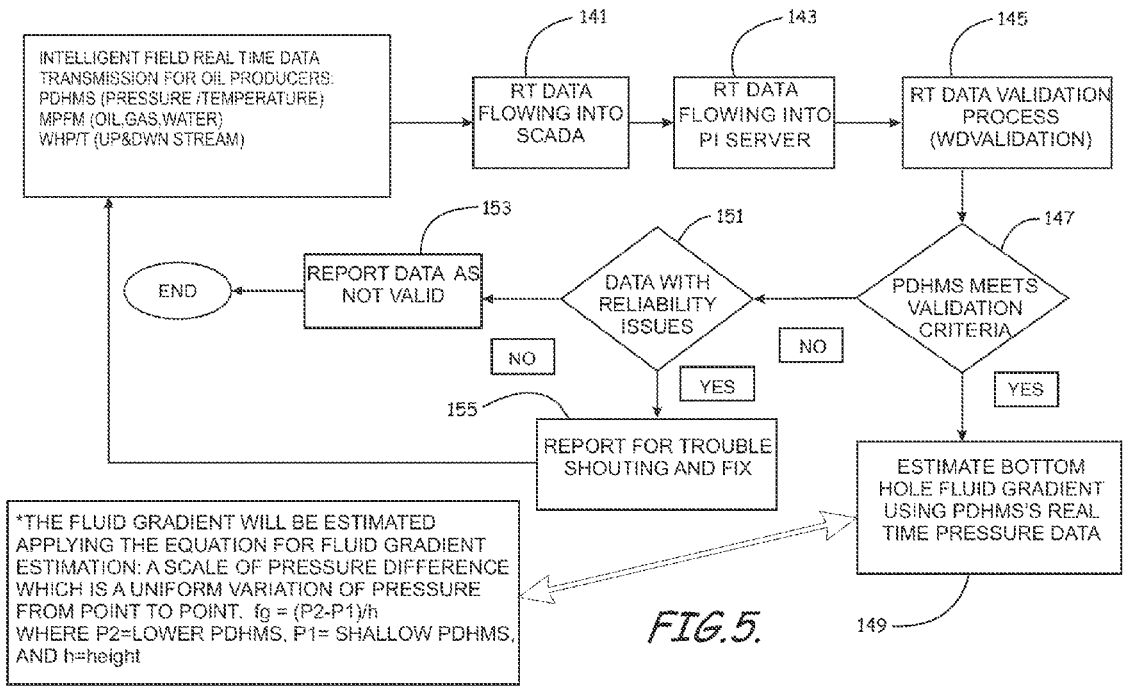
FIG. 5 is a schematic diagram illustrating an exemplary data flow for validating permanent downhole monitoring system (PDHMS) measurements and estimating, real-time, the fluid gradient using associated bottom hole gauge measurements according to an embodiment of the present invention.

FIG. 5 illustrates an exemplary data flow for validating permanent downhole monitoring system (PDHMS) measurements and estimating, real-time, the fluid gradient using associated bottom hole gauge measurements. At block 141, real-time PDHMS, multiphase flow meter (MPFM), and wellhead pressure/temperature(WHP/T) data flows into and through a SCADA system/server or other information server and to a process integration server (block 143). The real-time raw data flow is then received and processed for validation (blocks 145). If the PDHMS data meets the validation criteria (block 147), the data is deemed validated and the bottom hole fluid gradient is estimated using the PDHMS pressure data (block 149) and the data point is stored in database 43. According to an exemplary embodiment, the fluid gradient is estimated by applying an equation for fluid gradient estimation which includes a scale of a pressure difference (P2−P1) between shallow (P1) and bottom hole (P2) PDHMS measurement gauges over the height (h) therebetween. The fluid gradient (fg) equation can be written as $fg=(P2-P1)/h$. If the data does not meet the validation criteria at block 147 and the data is determined to have reliability issues (block 151), an automated report is generated and sent indicating that the data is not valid (block 153). If the data is reliable but not valid at block 151, an automated alert and report is generated to initiate troubleshooting and PDHMS system component repair (block 155).

Figure 6:
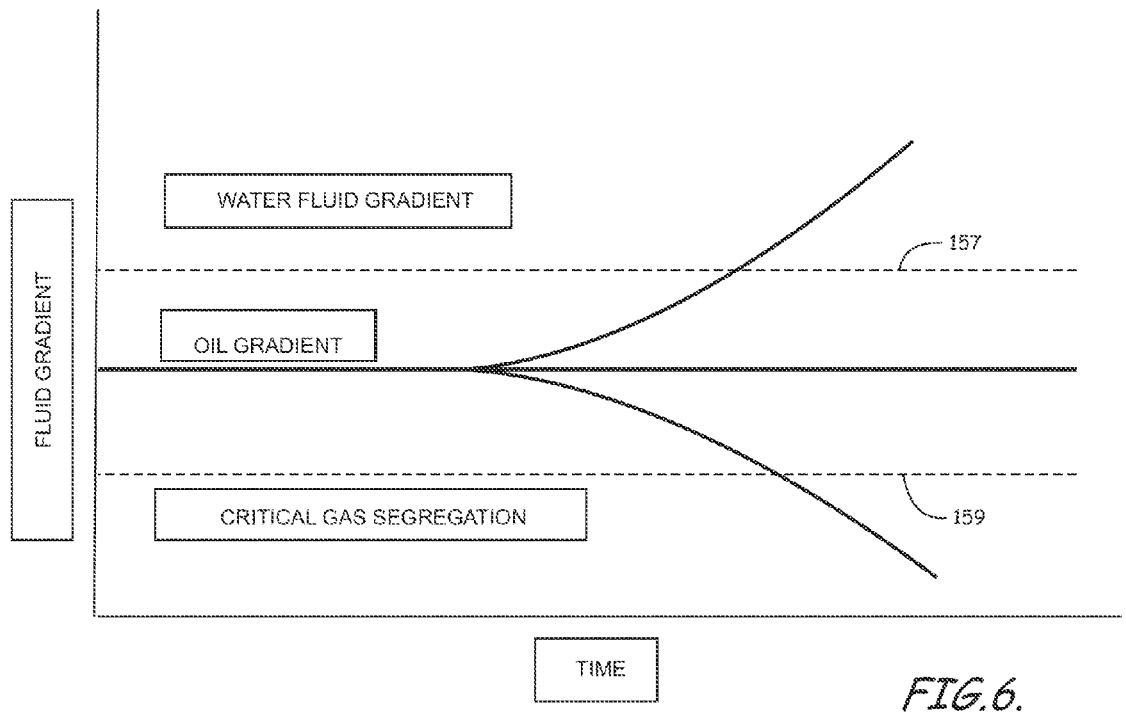
FIG. 6 is a graph illustrating a fluid gradient versus time trend analysis illustrating recognition of water incursion and gas segregation according to an embodiment of the present invention.

FIG. 6 is a graph illustrating a fluid gradient versus time trend analysis illustrating recognition of water incursion at 157 and gas segregation at 159.

Figure 7:
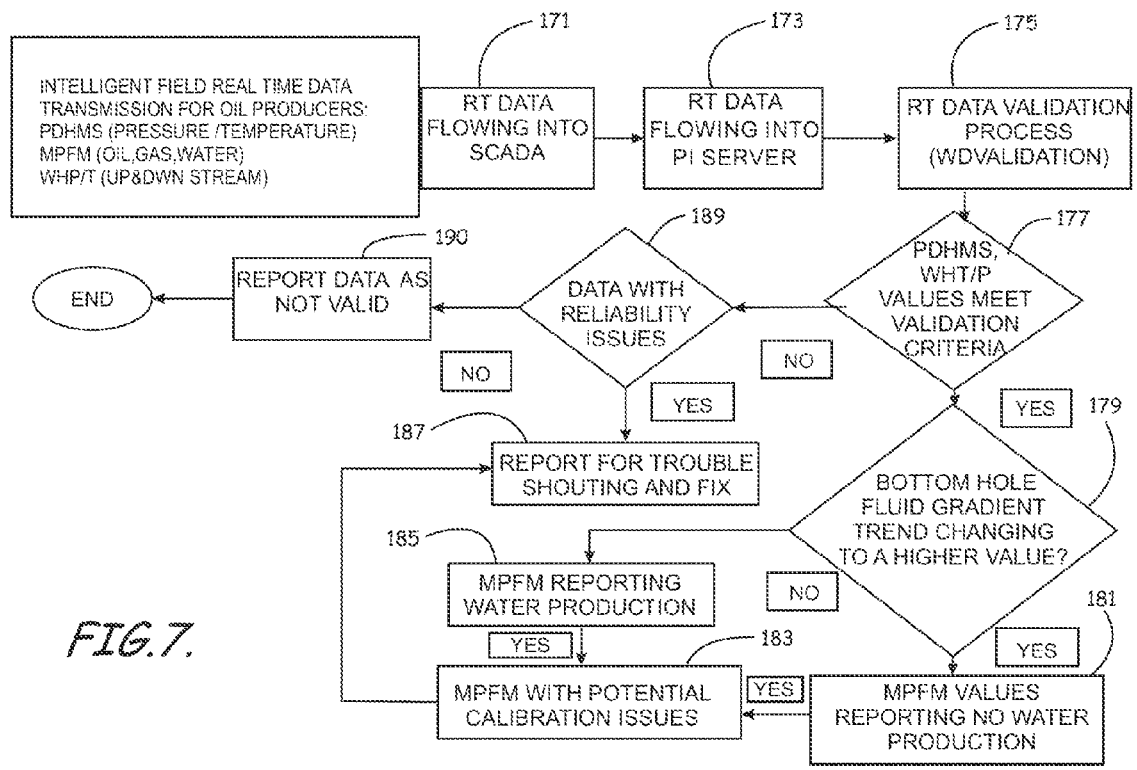
FIG. 7 is a schematic diagram illustrating an exemplary data flow for validating multiphase flow meter (MPFM) measurements and identifying water breakthrough and identifying/estimating water production according to an embodiment of the present invention.

FIG. 7 illustrates an exemplary data flow for validating multiphase flow meter (MPFM) measurements and identifying water breakthrough and identifying/estimating water production. At block 171, real-time PDHMS, multiphase flow meter (MPFM) and wellhead pressure/temperature (WHP/T) data flows into and through a SCADA system/server or other information server, and to a process integration server (block 173). The real-time raw data flow is then received and processed for validation (blocks 175). If the PDHMS and WHP/T data values meet the validation criteria (block 177), the data is deemed validated and the bottom hole fluid gradient is estimated and examined to determine if the bottom hole fluid gradient trend is changing to higher values (block 179). If so, and the MPFM values indicate no water production (block 181), an automated report is generated to flag the MPFM as having potential calibration issues (block 183). At the bottom hole gradient trend is not changing to higher values that the MPFM is reporting water production (block 185), an automated report is generated to flag the MPFM as having potential calibration issues (block 183). If the data does not meet the validation criteria at block 177 and the data is determined to have reliability issues (block 181), an automated report is generated and sent indicating that the data is not valid or reliable (block 190). If the data is reliable but not valid as determined at block 181, an automated alert and report is generated to initiate component troubleshooting and MPFM component repair (block 183).

Figure 8:
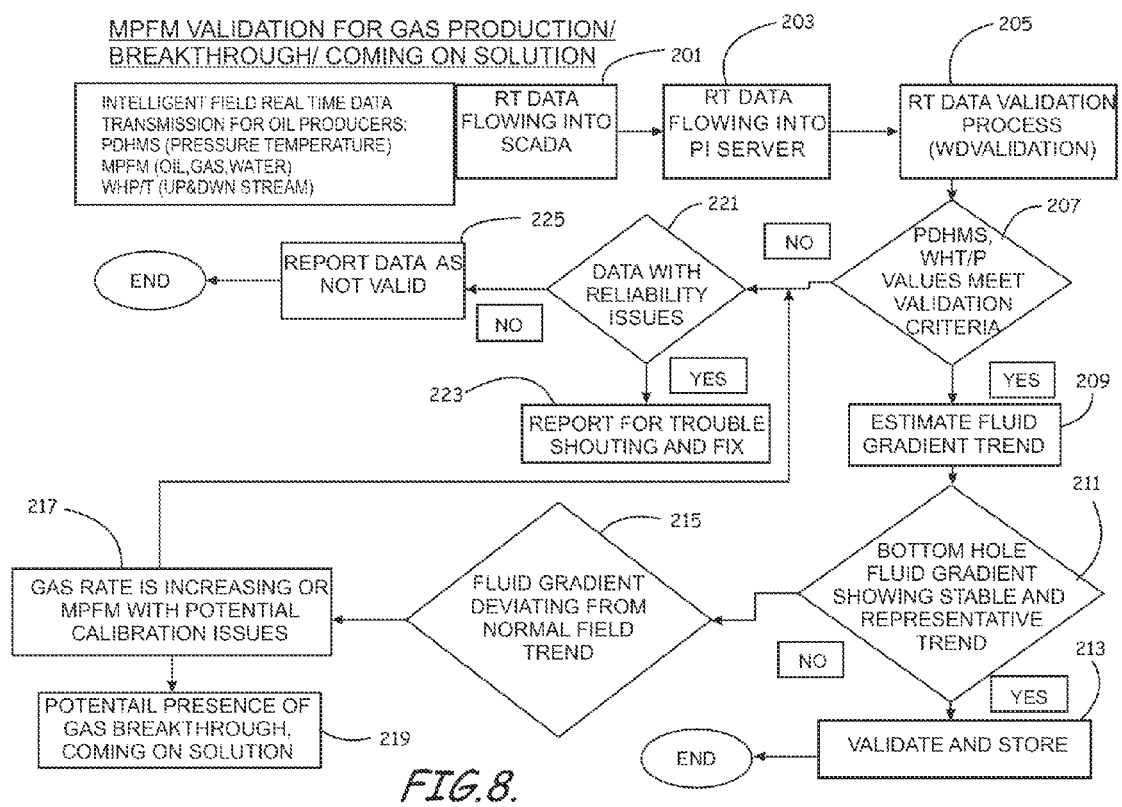
FIG. 8 is a schematic diagram illustrating an exemplary data flow for validating MPFM measurements and identifying gas breakthrough/gas coming on solution and identifying/estimating gas production according to an embodiment of the present invention.

FIG. 8 illustrates an exemplary data flow for validating multiphase flow meter (MPFM) measurements and identifying gas breakthrough/gas coming on solution and identifying/estimating gas production. At block 201, real-time PDHMS, MPFM, and WHP/T data flows into and through a SCADA system/server or other information server and to a process integration server (block 203). The real-time raw data flow is then received and processed for validation (blocks 205). If the PDHMS and WHP/T data values meet the validation criteria (block 207), the data is deemed validated, the bottom hole fluid gradient is estimated (block 209) and examined to determine if the bottom hole fluid gradient trend is stable and showing a representative trend (block 211). If so, the data/trend values are validated and stored (block 213). If the trend values are not stable/representative and the fluid gradient is deviating downward from a normal field trend (block 215), the gas rate may be increasing and the MPFM should be flagged as having potential calibration issues and alerts provided (block 217). If the gas rate is increasing, reports and alerts should be provided indicating potential presence of gas breakthrough or coming on solution (block 219). If the PDHMS and WHP/T data values do meet the validation criteria at block 207 and the data is deemed reliable (block 221), a report and alert should be initiated reporting for troubleshooting and repairing the respective components (block 223). If the data is not deemed reliable at block 221, the data should be reported as not valid and alerts published (block 225).

It is important to note that while the foregoing embodiments of the present invention have been described in the context of method steps which can be performed using or assisted by a fully functional computer apparatus, those skilled in the art will appreciate that the mechanism of at least portions of the present invention and/or aspects thereof are capable of being distributed in the form of a computer readable medium in a variety of forms capable of storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to program code/product 51 for managing an intelligent field along with computer implementable method steps, described above. The appended claims may reference, include, or feature "non-transitory computer readable storage medium" language, which is understood to be a recent U.S. Patent and Trademark Office requirement, and having a meaning designed to specifically indicate that the featured computer readable medium is not a propagating signal per se which was found to be non-statutory (unpatentable) subject matter according to a recent court case. It is further understood that non-transitory computer readable storage medium includes all computer readable storage medium that does not fall under the category of being non-statutory subject matter. Attachment 1, appended herewith provides additional program code according to various embodiments the present invention.

Various embodiments of the present invention provide several significant advantages and/or benefits. For example, various embodiments provide an effective apparatus and new methodologies to validate, in real time, data from intelligent fields. WDvalidation, for example, is the first application known to the inventors that can validate, in real time, all dynamic data from intelligent fields. Various embodiments of the present invention also advantageously provide a unique methodology designed to estimate fluid gradient variance, alteration or changes. Using this new methodology, the above-described apparatus can precisely determine any water influx into the oil producer. Additionally, various embodiments provide a unique methodology to detect anomalies and recommend calibration for any of the associated intelligent field components deemed to be out of tolerance. Various embodiments of the present invention can process to validate huge amount of data. As such, application of the various apparatus, methods, methodologies, and techniques can tremendously enhance the process of validating data.

Notably, during operational testing to which conventional methodologies were previously applied at a reservoir, ten wells were found to be transmitting bad data after implementing first phase of WDvalidation. Six MPFMs were also detected to be candidates for calibration. Accordingly, it has been shown not such action will have a tremendous impact on cost saving as well as ensure reliable data to engineers' desktop.

This application is a non-provisional of and claims priority to and the benefit of U.S. Patent App. No. 61/582,350, filed on Dec. 31, 2011, titled "Real-Time Dynamic Data Validation Apparatus, System, Program Code, Computer Readable Medium, and Methods For Intelligent Fields," and is related to U.S. patent application Ser. No. 13/731,238, filed on Dec. 31, 2012, titled "Real-Time Dynamic Data Validation Methods for Intelligent Fields," each incorporated by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus for managing an intelligent field, the apparatus comprising:
    a plurality of hydrocarbon well instruments, the well instruments comprising: a permanent downhole monitoring system (PDHMS), a multiphase flow meter (MPFM), a wellhead pressure (WHP) and wellhead temperature (WHT) measurement device, a tubing or casing annulus (TCA) pressure measurement, and optionally an electrical submersible pump (ESP) when desired;
    a supervisory control and data acquisition (SCADA) system for an intelligent hydrocarbon recovery field system, the SCADA system operably coupled to the plurality of well instruments to receive data from the plurality of well instruments;

a process integration (PI) server for the intelligent field system, the PI server operably coupled to the SCADA system to receive data from the SCADA system;

a dynamic field data analyzing computer including a processor and memory coupled to the processor, the dynamic field data analyzing computer operably coupled to the PI server to receive data from the PI server; and dynamic field data analyzing program code stored in the memory of the dynamic field data analyzing computer and including instructions that when executed by the dynamic field data analyzing computer, cause the computer to perform the operations of:

receiving real-time dynamic field data for the intelligent field system, the real-time field data comprising one or more well instrument data values for each of the plurality of well instruments;

analyzing validity of the dynamic field data, the analysis including comparing the one or more well instrument data values for at least one of the plurality of well instruments to validation criteria to determine whether one or more of the well instrument data values fall within respective validation criteria;

in response to determining that one or more of the well instrument data values fall within the respective validation criteria, validating the one or more well instrument data values that fall within the respective validation criteria;

in response to determining that one or more of the well instrument data values fall outside the respective validation criteria:

flagging the one or more well instrument data values that fall outside the respective validation criteria for the at least one well instrument;

determining whether the one or more well instrument data values that fall outside the respective validation criteria are reliable;

in response to determining the one or more well instrument data values that fall outside the respective validation criteria are reliable, generating an alert indicating the that the one or more well instrument data values are reliable and invalid; and in response to determining the one or more well instrument data values that fall outside the respective validation criteria are unreliable, generating a report indicating the that the one or more well instrument data values are unreliable and invalid.

2. The apparatus as defined in claim 1, wherein the validation criteria comprises a range of expected well instrument data values for the respective at least one well instrument based upon actual data values of at least two other of the plurality of well instruments.

3. The apparatus as defined in claim 1, wherein the operations further comprise establishing a neural network among the actual well instrument values for each of the plurality of well instruments to establish the validation criteria to thereby identify individual data points which fall outside an expected range of values for observed conditions.

4. The apparatus as defined in claim 1,
wherein the operation of receiving the real-time dynamic field data includes receiving data from the PI server, the PI server receiving data from the SCADA system, and the SCADA system receiving data from at least three of the plurality of well instruments; and wherein the well instruments data comprises data from at least three of the following sets of data: real-time PDHMS pressure and temperature data, real-time MPFM oil, gas, and water flow data, WHP and WHT data, TCA pressure data, and ESP electrical and pump parameters data.

5. The apparatus as defined in claim 1, wherein the operations further comprise estimating bottom hole fluid gradient responsive to real-time dynamic PDHMS pressure data from both a bottom hole PDHMS pressure measurement unit and a shallow PDHMS pressure measurement unit located a distance from the bottom hole PDHMS pressure measurement unit.

6. The apparatus as defined in claim 5,
wherein the received data includes real-time dynamic PDHMS pressure data from the bottom hole PDHMS pressure measurement unit and real-time dynamic PDHMS pressure data from the shallow PDHMS pressure measurement unit; wherein the respective at least one well instrument comprises the PDHMS measurement system;

wherein the operation of analyzing validity of the dynamic field data includes analyzing the validity of the real-time dynamic PDHMS pressure data from both the bottom hole PDHMS pressure measurement unit and the shallow PDHMS pressure measurement unit;

wherein the validation criteria comprises a range of expected PDHMS pressure data values for the bottom hole PDHMS pressure measurement unit and a range of expected PDHMS pressure data values for the shallow PDHMS pressure measurement unit; and wherein the operation of validating one or more well instrument data values that fall within the respective validation criteria includes validating the real-time dynamic PDHMS pressure data from both the bottom hole PDHMS pressure measurement unit and the shallow PDHMS pressure measurement unit.

7. The apparatus as defined in claim 5, wherein the operations further comprise:

determining a trend in real-time dynamic WHP data;
determining a trend in real-time dynamic WHT data; and
determining an increase in water entering the well when the bottom hole fluid gradient trend is higher, the wellhead pressure trend is lower, and the wellhead temperature trend is higher.

8. The apparatus as defined in claim 1, wherein the operations further comprise:

estimating a bottom hole fluid gradient trend responsive to real-time dynamic PDHMS pressure data from both a bottom hole PDHMS pressure measurement unit and a shallow PDHMS pressure measurement unit located a distance from the bottom hole PDHMS pressure measurement unit;

flagging the MPFM as having potential calibration issues when the estimated bottom hole fluid gradient trend is changing to higher values and the MPFM values indicate little or no water production; and flagging the MPFM as having potential calibration issues when the estimated bottom hole fluid gradient trend is not changing to higher values in the MPFM values indicate water production.

9. The apparatus as defined in claim 8,
wherein the received data includes the real-time dynamic PDHMS pressure data from the bottom hole PDHMS pressure measurement unit, real-time dynamic PDHMS pressure data from the shallow PDHMS pressure measurement unit, and one or more of the following: real-time dynamic WHP data and real-time dynamic WHT data, individually and collectively defining wellhead data;

wherein the operation of analyzing validity of the dynamic field data includes analyzing the validity of the real-time dynamic PDHMS pressure data from both the bottom hole PDHMS pressure measurement unit and the shallow PDHMS pressure measurement unit, and of the real-time dynamic wellhead data; and wherein the operation of validating the one or more well instrument data values that fall within the respective validation criteria includes validating the real-time dynamic PDHMS pressure data from both the bottom hole PDHMS pressure measurement unit and the shallow PDHMS pressure measurement unit, and from the wellhead data.

10. The apparatus as defined in claim 1, wherein the operations further comprise:

estimating a bottom hole fluid gradient trend responsive to real-time dynamic PDHMS pressure data from both a bottom hole PDHMS pressure measurement unit and a shallow PDHMS pressure measurement unit located a distance from the bottom hole PDHMS pressure measurement unit;

flagging the MPFM as having potential calibration issues when the estimated bottom hole fluid gradient trend is changing to lower values and the MPFM values indicate little or no gas rate increase indicative of potential presence of gas breakthrough or coming on solution; and flagging the MPFM as having potential calibration issues when the estimated bottom hole fluid gradient trend is not changing to lower values in the MPFM values indicate a gas rate increase indicative of potential presence of gas breakthrough or coming on solution.

11. A non-transitory computer readable medium having processor readable code stored thereon, the processor readable code executable by one or more processors of a dynamic field data analyzing computer to perform operations for managing an intelligent field, the operations comprising:

receiving real-time dynamic field data for an intelligent field system, the real-time field data comprising one or more well instrument data values for each of a plurality of well instruments for a well;

analyzing validity of the dynamic field data, the analysis including comparing the one or more well instrument data values for at least one of the plurality of well instruments to validation criteria to determine whether one or more of the well instrument data values fall within respective validation criteria;

in response to determining that one or more of the well instrument data values fall within the respective validation criteria, validating the one or more well instrument data values that fall within the respective validation criteria;

in response to determining that one or more of the well instrument data values fall outside the respective validation criteria:

flagging the one or more well instrument data values that fall outside the respective validation criteria for the at least one well instrument;

determining whether the one or more well instrument data values that fall outside the respective validation criteria are reliable;

in response to determining the one or more well instrument data values that fall outside the respective validation criteria are reliable, generating an alert indicating the that the one or more well instrument data values are reliable and invalid; and in response to determining the one or more well instrument data values that fall outside the respective validation criteria are unreliable, generating a report indicating the that the one or more well instrument data values are unreliable and invalid.

12. The non-transitory computer readable medium as defined in claim 11, wherein the validation criteria for at least one of the plurality of well instruments is determined based upon the observed values of at least two other of the plurality of well instruments.

13. The non-transitory computer readable medium as defined in claim 11, wherein the validation criteria for at least one of the plurality of well instruments comprises a range of expected well instrument data values for the at least one well instrument based upon observed data values of at least two other of the plurality of well instruments.

14. The non-transitory computer readable medium as defined in claim 11, wherein the operations further comprise establishing a neural network among the well instrument values for each of the plurality of well instruments to establish the validation criteria to thereby identify individual data points which fall outside an expected range of values for observed conditions.

15. The non-transitory computer readable medium as defined in claim 11, the operations further comprising:

in response to determining, based on one or more of the well instrument data values, that a plurality of well conditions for the well have been satisfied within preselected tolerances, validating a well state of the well, wherein the well is an oil producer, and wherein the well state comprises one of the following: well shut-in, well on, oil production increase, oil production decrease, gas oil ratio (GOR) increase, GOR decrease, water cut increase, water cut decrease, bottom hole pressure decrease, bottom hole pressure increase, bottom hole temperature decrease, and bottom hole temperature increase.

16. The non-transitory computer readable medium as defined in claim 15, wherein if the well is a water injector, the well state comprises one of the following: well off, well on, water injection rate increase, and water injection rate decrease; and wherein if the well is an observation well, the well state comprises one of the following: well off and well on.

17. The non-transitory computer readable medium as defined in claim 15, wherein the well state is a well shut-in state, and wherein the plurality of the well conditions comprise at least three of the following:

upstream pressure=downstream pressure;

a wellhead temperature (WHT) decrease and the WHT is close to ambient Temperature;

choke size is less than approximately two percent;

a flowing bottom hole pressure (BHP) increase;

a flowing bottom hole temperature (BHT) decrease; and when the well is completed with an electrical submersible pump:

a frequency of zero, and current of zero amps.

18. The non-transitory computer readable medium as defined in claim 15, wherein the well state is a well on state, and wherein the plurality of the well conditions comprise at least three of the following:

upstream pressure is not equal to downstream pressure;
a well head temperature increase;
a choke size greater than zero; and
when the well is completed with an electrical submersible pump:
a frequency greater than zero, and
current greater than zero amps.

19. The non-transitory computer readable medium as defined in claim 15, wherein the well state is an oil production increase state, and wherein the plurality of the well conditions comprise at least three of the following:
a flowing well head pressure decrease;
a well head temperature increase;
a choke size increase;
a flowing bottom pressure decrease;
a flowing bottom temperature increase; and
when the well is completed with an electrical submersible pump:
a frequency level increase,
a current level increase,
a bottom hole intake pressure decrease, and
a bottom hole discharge pressure increase.

20. The non-transitory computer readable medium as defined in claim 15, wherein the well state is an oil production decrease state, and wherein the plurality of the well conditions comprise at least three of the following:
a flowing well head pressure increase;
a well head temperature decrease but still above ambient temperature;
a choke size decrease;
a bottom hole pressure increase;
a bottom hole temperature decrease; and
when the wells is completed with an electrical submersible pump:
a frequency level decrease,
a current level decrease,
an intake pressure increase, and
a discharge pressure decrease.

21. The non-transitory computer readable medium as defined in claim 15, wherein the well state is a water cut increase state, and wherein the plurality of the well conditions comprise at least two of the following:
a well head pressure decrease;
a fluid gradient increase;
a well head temperature increase; and
a bottom hole pressure decrease.

22. The non-transitory computer readable medium as defined in claim 15, wherein the well state is a water cut decrease state, and wherein the plurality of the well conditions comprise at least two of the following:
a well head pressure increase;
a fluid gradient decrease;
a well head temperature decrease; and
a bottom hole pressure increase.

23. The non-transitory computer readable medium as defined in claim 15, wherein the well state is a bottom hole pressure decrease state, and wherein the plurality of the well conditions comprise at least two of the following:
a choke size increase;
a WHT increase; and
a bottom hole temperature increase.

24. The non-transitory computer readable medium as defined in claim 15, wherein the well state is a bottom hole pressure increase state, and wherein the plurality of the well conditions comprise at least two of the following:
a choke size decrease;
a well head temperature decrease; and
a bottom hole temperature decrease.

25. The non-transitory computer readable medium as defined in claim 15, wherein the well is a water injector well, wherein the well state is a well off state, and wherein the plurality of the well conditions comprise at least two of the following:
a choke size less than approximately 5%;
a WHP decrease; and
a WHT decrease and close to ambient temperature.

26. The non-transitory computer readable medium as defined in claim 15, wherein the well is a water injector well, wherein the well state is a well on state, and wherein the plurality of the well conditions comprise at least two of the following:
a choke size greater than approximately 10%;
a WHP increase; and
a WHT decrease.

27. The non-transitory computer readable medium as defined in claim 15, wherein the well is a water injector well, wherein the well state is a water injection rate increase state, and wherein the plurality of the well conditions comprise at least two of the following:
a choke size increase;
a WHP increase; and
a WHT increase.

28. The non-transitory computer readable medium as defined in claim 15, wherein the well is a water injector well, wherein the well state is a water injection rate decrease state, and wherein the plurality of the well conditions comprise at least two of the following:
a choke size decrease;
a WHP decrease; and
a WHT decrease.

29. The non-transitory computer readable medium as defined in claim 15, wherein the well is an observation well, wherein the well state is a well off state, and wherein the plurality of the well conditions comprise at least three of the following:
a choke size less than approximately 0.2%;
a WHP decrease;
a WHT decrease and close to ambient temperature;
a stable bottom hole pressure; and
a stable bottom hole temperature.

30. The non-transitory computer readable medium as defined in claim 15, wherein the well is an observation well, wherein the well state is a well on state, and wherein the plurality of the well conditions comprise at least three of the following:
a choke size greater than zero;
a WHP increase;
a WHT increase and above ambient temperature;
a bottom hole pressure decrease; and
a bottom hole temperature decrease.

31. The non-transitory computer readable medium as defined in claim 15, wherein the well state is a GOR increase state, and wherein the plurality of the well conditions comprise at least two of the following:
a water cut increase;
a well head pressure increase;
a fluid gradient decrease; and
a well head temperature decrease.

32. The non-transitory computer readable medium as defined in claim 15, wherein the well state is a GOR decrease state, and wherein the plurality of the well conditions comprise at least two of the following:
a well head pressure decrease;
a fluid gradient increase; and
a well head temperature increase.

33. The non-transitory computer readable medium as defined in claim 11, wherein the operations further comprise:
estimating bottom hole fluid gradient responsive to real-time dynamic PDHMS pressure data from both a bottom hole PDHMS pressure measurement unit and a shallow PDHMS pressure measurement unit located a distance from the bottom hole PDHMS pressure measurement unit.

34. The non-transitory computer readable medium as defined in claim 33, wherein the operations further comprise:
determining a trend in real-time dynamic WHP data;
determining a trend in real-time dynamic WHT data; and
determining an increase in water entering the well when the bottom hole fluid gradient trend is higher, the wellhead pressure trend is lower, and the wellhead temperature trend is higher.

35. The non-transitory computer readable medium as defined in claim 11, wherein the operations further comprise:
estimating a bottom hole fluid gradient trend responsive to real-time dynamic PDHMS pressure data from both a bottom hole PDHMS pressure measurement unit and a shallow PDHMS pressure measurement unit located a distance from the bottom hole PDHMS pressure measurement unit;
flagging a multiphase flow meter (MPFM) as having potential calibration issues when the estimated bottom hole fluid gradient trend is changing to higher values and MPFM values indicate little or no water production; and
flagging the MPFM as having potential calibration issues when the estimated bottom hole fluid gradient trend is not changing to higher values in the MPFM values indicate water production.

36. The non-transitory computer readable medium as defined in claim 11, wherein the operations further comprise:
estimating a bottom hole fluid gradient trend responsive to real-time dynamic PDHMS pressre data from both a bottom hole PDHMS pressure measurement unit and a shallow PDHMS pressure measurement unit located a distance from the bottom hole PDHMS pressure measurement unit;
flagging an MPFM as having potential calibration issues when the estimated bottom hole fluid gradient trend is changing to lower values and MPFM values indicate little or no gas rate increase indicative of potential presence of gas breakthrough or coming on solution; and
flagging the MPFM as having potential calibration issues when the estimated bottom hole fluid gradient trend is not changing to lower values in the MPFM values indicate a gas rate increase indicative of potential presence of gas breakthrough or coming on solution.

37. The non-transitory computer readable medium as defined in claim 11, wherein the operation of receiving the real-time field data includes receiving data from a process integration (PI) server, the PI server receiving data from a supervisory control and data acquisition (SCADA) system, and the SCADA system receiving data from the plurality of well instruments, and the well instruments data comprising at least three of the following sets of data: real-time permanent downhole monitoring system (PDHMS) pressure and temperature data, real-time multiphase flow meter (MPFM) oil, gas, and water flow data, wellhead pressure (WHP) and wellhead temperature (WHT) data, tubing or casing annulus (TCA) pressure data, and electrical submersible pump (ESP) electrical and pump parameters data.

38. A method for managing an intelligent field, the method comprising a processor of a data analyzing computer executing code stored on a memory to performing the following operations:
receiving real-time dynamic field data for an intelligent field system, the real-time field data comprising one or more well instrument data values for each of a plurality of well instruments for a well;
analyzing validity of the dynamic field data, the analysis including comparing the one or more well instrument data values for at least one of the plurality of well instruments to validation criteria to determine whether one or more of the well instrument data values fall within respective validation criteria;
in response to determining that one or more of the well instrument data values fall within the respective validation criteria, validating the one or more well instrument data values that fall within the respective validation criteria;
in response to determining that one or more of the well instrument data values fall outside the respective validation criteria:
flagging the one or more well instrument data values that fall outside the respective validation criteria for the at least one well instrument;
determining whether the one or more well instrument data values that fall outside the respective validation criteria are reliable;
in response to determining the one or more well instrument data values that fall outside the respective validation criteria are reliable, generating an alert indicating the that the one or more well instrument data values are reliable and invalid; and
in response to determining the one or more well instrument data values that fall outside the respective validation criteria are unreliable, generating a report indicating the that the one or more well instrument data values are unreliable and invalid.

\* \* \* \* \*

UNITED STATES PATENT AND TRADEMARK OFFICE
CERTIFICATE OF CORRECTION

PATENT NO. : 9,268,057 B2  
APPLICATION NO. : 13/731257  
DATED : February 23, 2016  
INVENTOR(S) : Abdel Nasser Abitrabi et al.

Page 1 of 1

It is certified that error appears in the above-identified patent and that said Letters Patent is hereby corrected as shown below:

Claims

In Column 22, Line 35, Claim 36, the fifth word appears as "pressre" and should read --pressure--.

Signed and Sealed this  
Third Day of May, 2016

Michelle K. Lee  
*Director of the United States Patent and Trademark Office*